United States Patent [19]

Kuwahara et al.

[11] Patent Number: 4,901,634
[45] Date of Patent: Feb. 20, 1990

[54] VACUUM SEASONING DEVICE

[75] Inventors: Hiroyuki Kuwahara; Torazi Kimura, both of Niigata, Japan

[73] Assignee: Ookawa Iron Works, Ltd., Niigata, Japan

[21] Appl. No.: 364,076

[22] Filed: Jun. 8, 1989

Related U.S. Application Data

[63] Continuation of Ser. No. 229,623, Aug. 8, 1988, abandoned.

[51] Int. Cl.$^4$ .............................................. A23B 7/00
[52] U.S. Cl. .......................................... 99/472; 53/79; 99/454; 206/524.8; 215/262; 220/231
[58] Field of Search ................. 99/472, 349, 516, 350, 99/467, 469, 473, 483, 484, 485, 494; 215/262; 220/420, 231; 206/829, 524.8; 53/266 R, 79, 97–99; 366/139

[56] References Cited

U.S. PATENT DOCUMENTS

| | | | |
|---|---|---|---|
| 762,140 | 6/1904 | Cates | 53/98 |
| 2,036,007 | 3/1936 | Wheatley et al. | 99/472 |
| 2,339,791 | 1/1944 | Mahlke | 53/98 |
| 2,457,867 | 1/1949 | Chambers | 99/472 X |
| 3,769,902 | 11/1973 | Hurwitz | 99/472 |
| 3,943,987 | 3/1976 | Rossi | 206/524.8 |
| 4,051,971 | 10/1977 | Saleri et al. | 215/262 X |
| 4,218,967 | 8/1980 | Batchelor | 99/472 |
| 4,287,819 | 9/1981 | Emerit | 99/472 |
| 4,362,095 | 12/1982 | Wheatley | 220/231 |
| 4,372,096 | 2/1983 | Baum | 53/98 X |

FOREIGN PATENT DOCUMENTS 691598  7/1964  Canada .................................. 99/472

Primary Examiner—Timothy F. Simone
Attorney, Agent, or Firm—Bucknam and Archer

[57] ABSTRACT

This invention relates to a vacuum seasoning device, which is compact in size and simple in structure, and comprises a main body casing which contains a vacuum pump mechanism consisting of a piston, cylinder, and the like arranged horizontally; and said main body is so rotatably supported by a support column that it can transpose itself from a horizontal position to a position where its front portion is slightly raised; and when it is positioned horizontally the base plate of the same hermetically contacts the upper opening edge of the pressure container placed below it, and sucks the air out of the container by means of the horizontal reciprocating movement of the piston, and vent through suction port arranged on the base plate, suction channel of aforementioned vacuum pump mechanism, and then through communicating section thereof.

4 Claims, 10 Drawing Sheets

VACUUM SEASONING DEVICE

This is a continuation of application Ser. No. 229,623, filed Aug. 8, 1988, abandoned.

TECHNICAL FIELD OF THE INVENTION

This invention relates to a vacuum seasoning device compact in size and most suitable for use mainly at home for quick seasoning of cooking materials by filling the container with both the seasoning liquid and foodstuff to be seasoned, and thereupon reducing the pressure inside of said container.

DETAILS OF PRIOR ART

As a technique for impregnating cooking materials such as vegetables and the like with seasoning liquids in very short time, a vacuum cooking method has been known widely. According to this method, the cooking material cut into appropriate sizes or as the entire piece is put into a pressure container together with the desired seasoning liquids, and whereupon the interior of the container is decompressed by sucking out the air, and then by instantly exposing the so-far decompressed container to the atmosphere thereby equalizing the inside pressure of the container with that of the open air to induce the rapid impregnation of the seasoning by penetration through the surface of the foodstuff to be seasoned.

Most of such vacuum seasoning devices employing this vacuum seasoning method are produced in large sizes suitable for business, but neither in compact sizes nor in simple construction suitable for home use. It is of course theoretically possible to produce such a device for home use by combining a container and small vacuum pump. While a combination of a suitable pump, air suction channel, and the container may tend to be expensive, the less costly combination of components into a similar device would require them to be much larger in dimensions if sufficiently strong decompression from a pump and sufficient airtightness of the container are desired.

The adoption of a special-purpose pump for the purpose of making the device handy will only result in greater shortcomings such a pump may inherently have with the vulnerability of the device itself. It is possible, for instance, to make use of a small ejector pump that takes advantage of the pressure of city water supply, as is seen in the disclosed utility model No. 149800/1986 in the Japanese laid open gazette, in which case a hermetically sealed pressure container of small size and a channel connecting them were formed into a vacuum seasoning device. Not only must such a device bear with a bulky channel, but it requires a rather high water pressure of more than 5 kg/cm$^3$ for satisfactory performance of decompression, a requirement that will result in the waste of water resources. Utilization of a pump designed for a specific single purpose will also entail various problems in handling and maintaining it.

SUMMARY OF THE INVENTION

The object of this invention is to provide a vacuum seasoning device of low-cost through the use of a pump of comparatively simple structure.

Another object is to produce such device that may create a satisfactory vacuum condition in the container by simple operation in order to keep its compactness.

In order to attain such objectives, the device of this invention is provided with the main body casing which is installed on the support column in such a rotatably manner that the casing may move from the horizontal position to a slightly raised position at its front end at a predetermined angle; a cylinder, piston and related assemblies for decompression of the container arranged horizontally; and the base plate of the main body casing which hermetically seals the container positioned beneath it by tightly contacting the container's upper opening edge, and at the same time providing a communicating channel through the air suction port arranged on the base plate itself and the air suction channel located at the bottom of the cylinder for effecting the deaeration of said container by means of the horizontal reciprocating movement of the piston; and all those components attributed to forming a compact vacuum seasoning device.

Since the pivot support section of the main body casing is so arranged that a slight change of its vertical position is allowed to take place, the base plate acting also as the lid of the container may be assured of its hermetical contact with the upper opening edge of the container to maintain its inside airtightness. The main bodies of the cylinder and piston in their opposite surfaces are devoid of the protrusions of suction and discharge valve seats so that they may closely contact; as well as the suction port on the base plate and the suction channel of the bottom part of the cylinder are linked by a comparatively short route, and both of these factors contribute to assured and effective suction to create decomposition inside of the container.

This invention has made it possible to decompress the inside of the container by a simple reciprocating action of the piston rod either manually or electrically to give a small vacuum seasoning device of good operability.

The vacuum pump itself is of simple construction produceable at very low cost.

DETAILED EXPLANATION OF THE PREFERRED EMBODIMENT

Figure 1:
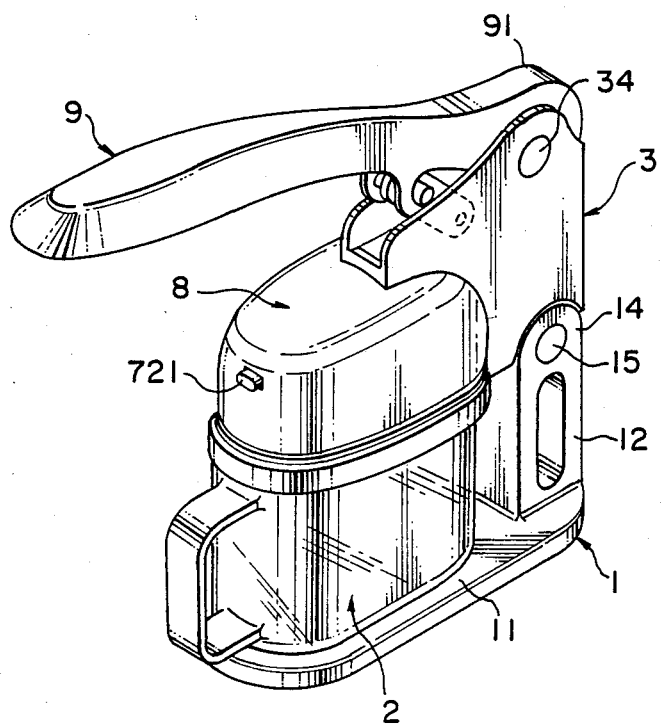
FIG. 1 is a perspective view of a vacuum seasoning device illustrated as an embodiment of this invention.
Figure 2:
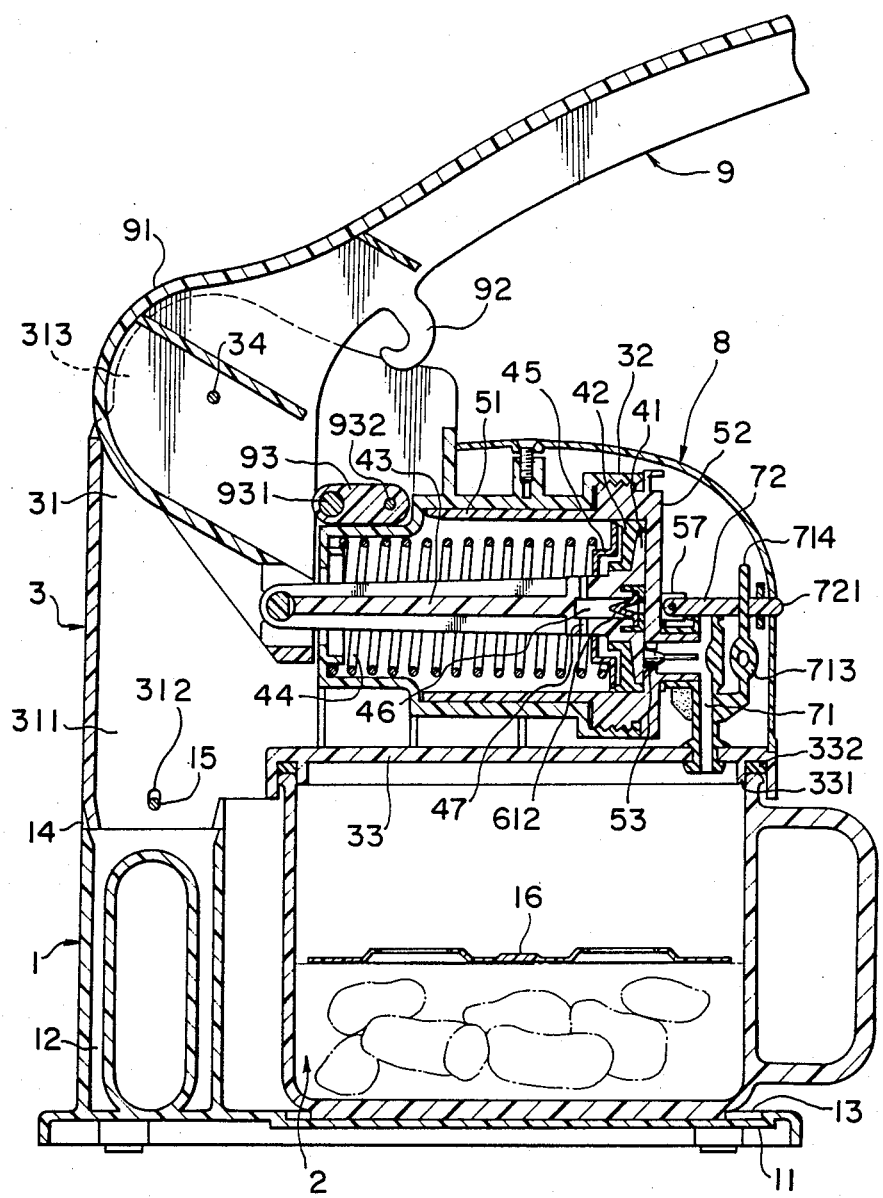
FIG. 2 is a vertical sectional view of the device of FIG. 1.

FIG. 1 is an perspective view of a vacuum seasoning device as an embodiment of this invention and FIG. 2 is a vertical sectional view thereof.

In both of these figures, the support stand 1 is molded monolithically of synthetic resin such as ABS, and comprises the base 11 on which the container is to be placed, and the support column 12 standing along one side of the base 11. The base 11 is provided with a thinly hollowed groove 13 on which the bottom of the container 2 is stably supported. The support column 12 has on its upper edge a two-pronged holding piece 14 which rotatably supports the main body casing 3.

The container 2 is composed of pressure-resistant plastic material, and has the height extending from the base 11 to the base plate 33 of the main body casing 3.

The main body casing 3 is monolithically molded of synthetic resin such as ABS, and comprises the side frame 31, the cylinder shaped housing 32 projecting horizontally therefrom, and the base plate 33 projecting in parallel direction and below the cylinder shaped housing 32. The side frame 31 is pivotally supported through the axis 15 located at its lower edge part 311 by the two pronged holding piece 14 of the support column 12, and rotates said base plate 33 and the housing 32 which move within the range of their horizontal positions and the upper limit their front edges are designed to move according to the dihedral angle they are specifically provided (Refer FIG. 10). The pivotal axis hole 312 provided at the bottom edge of the side frame 31 is made vertically oblong for allowing the main body casing to slightly move upward and downward relative to the position of the support column 12. The vertical play thus given to the pivotal axis hole 312 enables the tight contact of the base plate 33 and the opening edge of the container 2 during the operation. The base plate 33 is provided with an intake port 333 in the forward part, and gland packing 332 made of material such as elastomer which is able to tightly contact the opening edge of the container 2, which is positioned beneath the bottom surface thereof. The housing 32 is open at the front and rear ends and provided with a threaded groove on the inner surface at its front end. The housing 32 is also provided with the mounting for attaching screw of the cover 8 which shelters the housing 32, projecting from the upper surface thereof.

Figure 3:
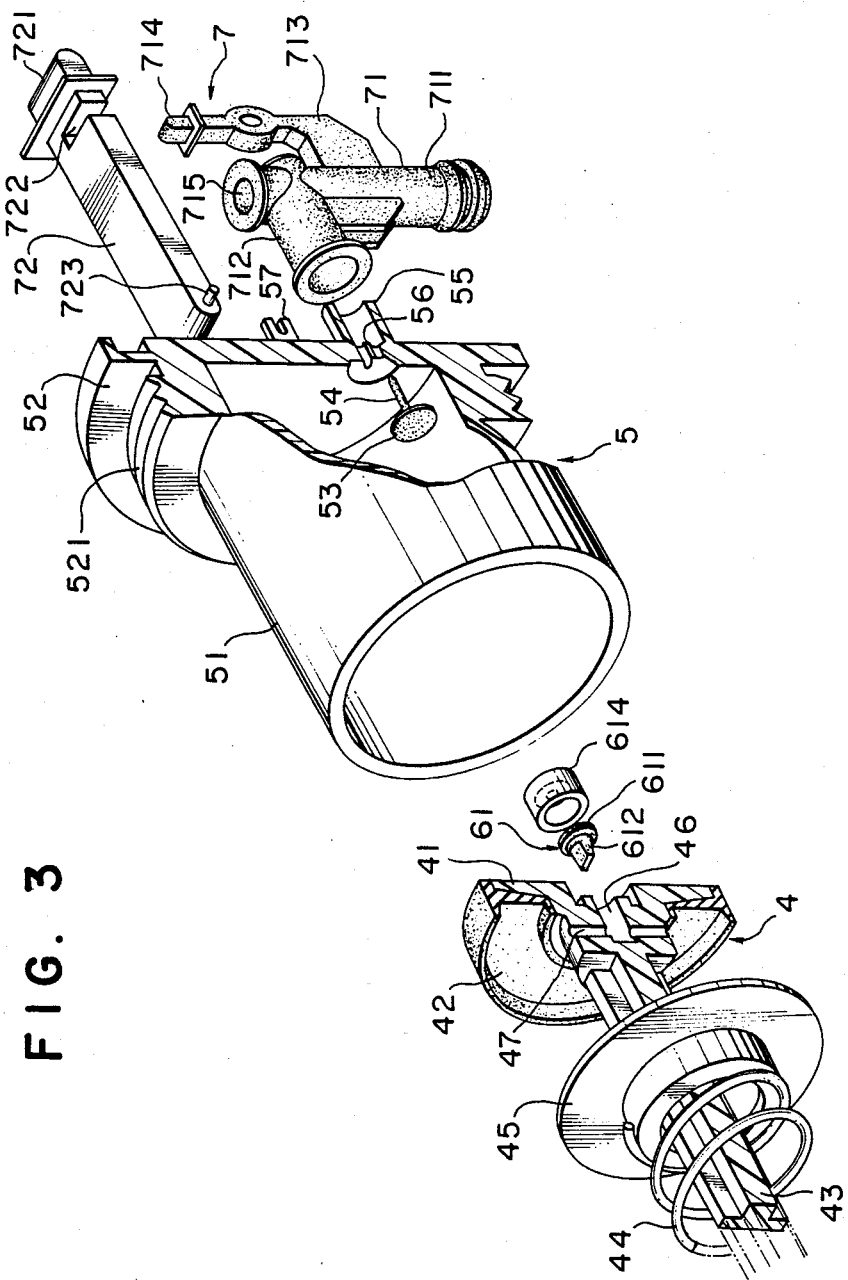
FIG. 3 is an oblique projection of disassembled main part of the vacuum mechanism.

The housing 32 is equipped, in its interior, with the assemblies of the piston 4 and cylinder 5, and discharge check valve 61. The FIG. 3 illustrates that the piston assembly has the piston rod 43 the tip of which is formed into the disc-shaped main body of the piston 41, and the rear or the other end of which is pivotally supported by the lower end of the L-shaped operating lever 9 to be described later. The piston main body 41 has, along its center axis, the discharge channel 46 which is provided with upward and downward discharge ports 47 communicating with the exterior atmosphere. On the piston main body 41 is attached the piston seal 42 which slidably contacts the inner surface of the cylinder assembly 5 mentioned above. The piston seal 42 envelopes the outer edge and the inner surface of the piston main body 41, and is pressed to the inner surface thereof by the pushing disc 45 which in turn is constantly under pressure by the spring 44 which is coiled along the circumference of the piston rod 43, toward the inner surface of the piston main body 41.

Figure 4:
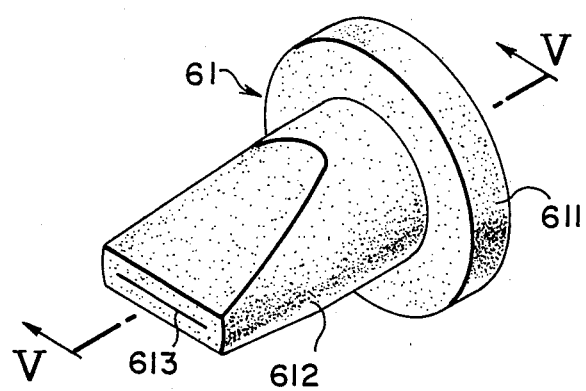
FIGS. 4, 5, and 6 are, respectively, an oblique projection, V—V sectional view, and a front view of the suction check valve.
Figure 5:
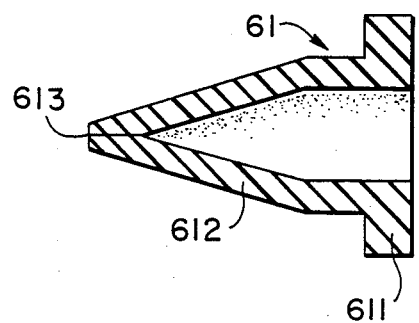
Figure 6:
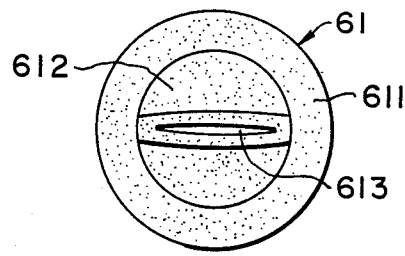

The discharge check valve 61 comprises, as shown in the FIGS. 4 and 5, a flange body 611 and a barrel 612 which is shaped cross-sectionally like a truncated pyramid, the latter being extruded integrally with the former. A slit opening 613 which communicates the interior cavity and the exterior is provided at the tip of the barrel. The check valve 61 has its flange 611 in contact with the valve seat of the entrance opening of the discharge channel 46. The barrel 612 is inserted into the discharge channel 46 itself. The exterior surface of the flange 611 is held into the valve seat by the valve arrester 614, a cylindrical body with its one end closed, thus positioning itself fixedly at the entrance opening of the discharge channel 46 to effect a unidirectional ventilation from the piston main body 41 toward the piston rod 43. At the closed bottom of the valve arrester is provided a vent port, and when the valve arrester 614 is positioned in the discharge channel 46 of the piston main body 41, the bottom and the outer surface of the piston main body 41 together form a flat surface.

The cylinder 51, a main part of cylinder assembly 5, is provided with the air suction channel 55 protruding from its bottom part 52, and on the peripheral of the flange 611 which protrudes outwardly from said bottom part 52 is formed the screw groove 521 which meshes with the interior groove of the housing 32, as previously mentioned. On the valve seat provided at the suction opening inside the cylinder is installed a mushroom-shaped suction check valve 53 that enables unidirectional ventilation from the outer side of the cylinder 51 toward the inner side of the same.

In FIG. 3 are illustrated the arrester 54 of the suction check valve 53, the anchor hole 56 into which the arrester 54 is inserted, and the bearing 57 which projects from the base surface 52 of the cylinder 51 and forms the cross-sectional shape of ], rotatably supporting the pins 723 that protrude at both the rearside ends of release valve 72 which is described later.

The communicating section 7 is arranged in the space S existing between the bottom end 52 of the cylinder 51 which is installed in the housing 32, and the cover 8. Said communicating section 7 interlinks the suction port 333 of the aforementioned base plate 33 and the outer end of the suction channel 55, and through the release valve 72 makes said suction port 333 communicate directly with the exterior atmosphere. Said communicating section 7 comprises a cylindrical body 71 made of elastic material such as elastomer and shaped in inverted L, an elastic piece 713 integrally molded and protruding upward from a side of said cylindrical body 71, and the release valve 72 made of ABS plastic material and the like.

The cylindrical main body 711 extending vertically upward and downward from the cylindrical body 71 is open at both the ends, its lower end being insertably attached to the suction port 333 of the base plate 33, and its upper end 715 closed by the flat release valve 72. The horizontal part 712, of the cylindrical body 71, being shunted from the cylindrical main body 711, interlinks with the inner ventilation channel of said main body 711 and has its opened end insertably attached to the air suction channel 55 at the bottom part of the cylinder.

The elastic piece 713 has vertical elasticity, and is provided at its upper end 714 with a topping piece to be anchored in the slot provided in the release valve 72.

The release valve 72 is an elongated narrow plate, having the pins 723 which are supported rotatably by aforementioned bearing 57, protruding from both sides of its rear end, and a sidelong slot 722 in which the topping piece of the elastic piece 713, located close to the front end thereof is anchored. Said release valve 72 blocks the opening located at the upper end of cylindrical main body 715 of the main cylindrical body 71 thereof by tightly placing its plate surface against said opening.

The operating lever 9 makes the piston assembly 4 move reciprocally in the cylinder, as mentioned previously, and is integrally molded of synthetic resin such as polyacetal and the like in approximate L shape, being at its curved portion 91 pivotally attached to the upper end of the side frame 31 by means of the pin 34, and being pivotally supported at its lower end by the rear end of the piston rod 43, and has its main handle part extending over the entire length of the cover 8. The hook 92 is formed in the downward direction close to the base and inside the main handle part, so as to be arrested by the stopper 93 installed on the upper rear end of the housing 32 to hold down the operating lever 9 in the pushed down position. FIG. 2 illustrates the stopper 93 being pivotally supported at its front end by the pin 932 while the arresting piece 931 of the hook 92 is extended sideways at its rear end.

To operate this vacuum seasoning device, vegetables and other materials desired to be seasoned and prearranged seasoning liquid are put into the container 2, and the removable floating lid 16 is placed into the container above the foodstuff. The container is then positioned over the hollowed groove 13 of the base 11. The main body casing 3 is at the position rotated toward the support column 12 with front portion raised. When the main body casing 3 is rotated to cover the container 2 positioned on the base 11, the gland packing 332 provided on the base plate 33 of the main body casing 3 will contact the upper opening edge of the container 2. By strongly pressing down the operating lever 9, the main body casing 3 will shift its position a little downward because of the vertical play of the pivotal axis hole 312 of the lower edge part 311, to maintain the airtightness of the container 2 by pressing the gland packing 332 strongly on the upper opening edge of said container 2. The sealing contact between the base plate 33 and the upper opening edge of the container 2 is assured by means of this action even if there is no exact equality between the distance from the base plate 33 to the base 11 of the main body casing 3, and the depth of the container 2.

Figure 7:
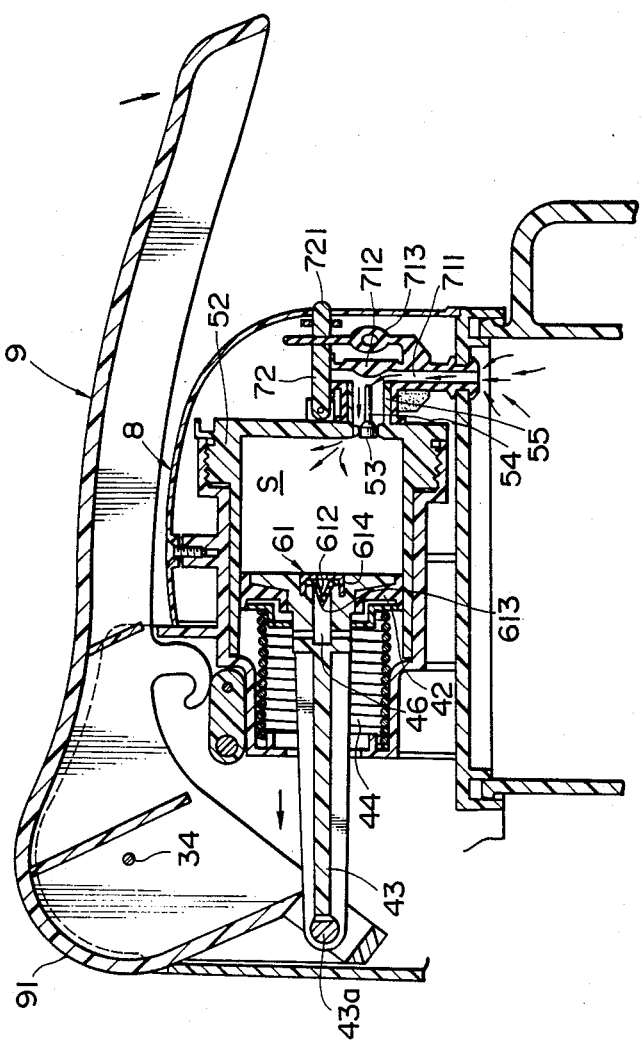
FIGS. 7, 8 and 9 are sectional views of the main parts in operation.

Then as shown in FIG. 7, the pressing downward of the operating lever 9 will cause its lower end to pull the piston rod 43 which in turn pulls the piston away from the depth of the cylinder to create a space S of negative pressure within the cylinder. Since the suction check valve 53 is opened while the slit opening 613 of the discharge check valve 61 is closed, the air held in the container 2 will flow into above space S through the cylindrical main body 711, horizontal part 712, and air suction channel 55. Because of the closure of the upper end of the cylindrical main body 711 by means of the release valve 72, the airtightness is maintained between the container 2 and the space S.

Figure 8:
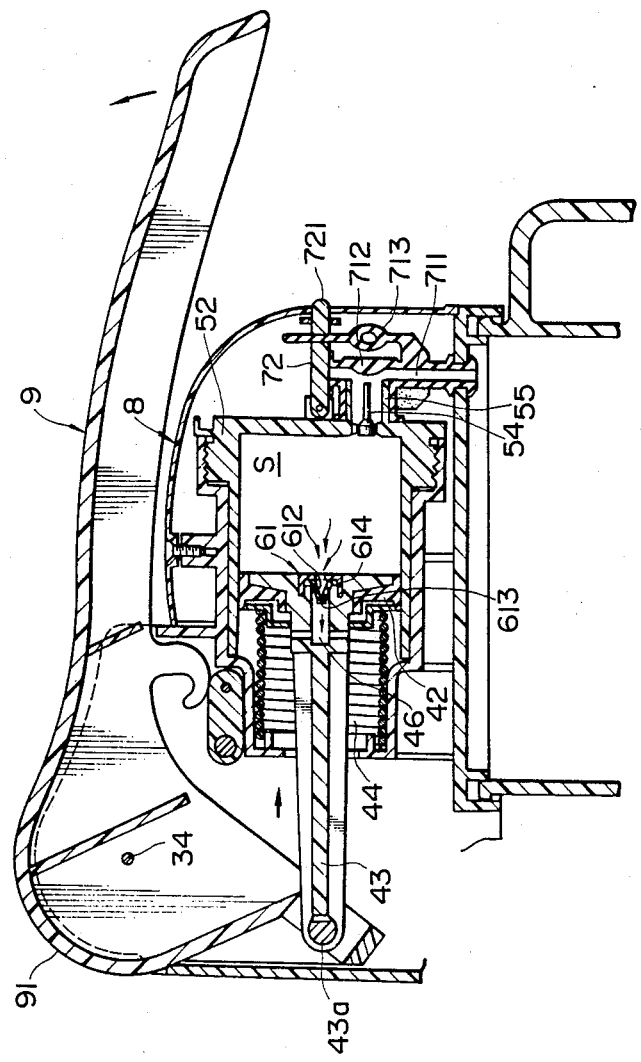

As illustrated in FIG. 8, the release of the downward pressure of the operating lever 9 will cause the piston rod 43 move forward into the depth of the cylinder by means of the pressure exerted by the spring 44. As a consequence, the suction valve 53 is pressed closed against the suction channel 55, the slit opening 613 of the discharge check valve 61 will be widened and due to the increased pressure of the air within the space S, to discharge the air of the space S to the ambience through the discharge channel 46. As a result, the interior space of the container 2 and its interconnected communicating section 7 will have negative pressure by the amount of the air discharged.

Since there is no protrusions on the opposing surfaces of the piston main body 41 and cylinder 51, a tight contact of the piston which has moved toward and the bottom surface of the cylinder can be made to perform efficient deaeration.

Through the repetition of the movements indicated in the FIGS. 7 and 8 for several times, the inside of the container 2 will be decompressed progressively and the materials for the seasoning are accordingly deaerated. Since the operating lever 9 is positioned vertically above the container 2 and the upper part of the vacuum pump, the motion of the lever 9 causes the packing 322 at the base plate of the main body casing 33 have tight contact with the opening edge of the container 2 and pushes the casing 3 and the container 2 downward. In this manner the lever 9 may perform a series of operations with stability.

Figure 9:
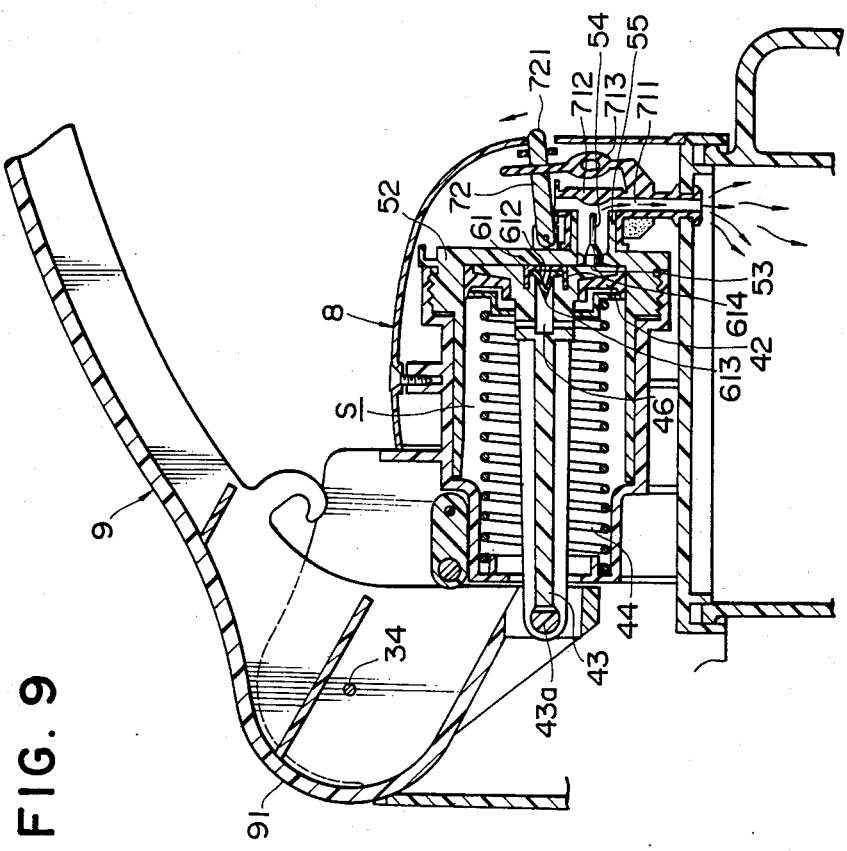

When the state of vacuum is attained within the container 2 to some extent, one may uplift the front end of the release valve 72 which protrudes from the surface of the cover 8, manually and by overriding the elastic resistance of the elastic piece 713, as illustrated in FIG. 9. Then the plate surface of the release valve 72 will be lifted off the top of the cylindrical main body 711 to release the communicating section and the like, which were hitherto kept hermetically, to the open air. The air will, as a result, flow into the container 2 through the cylindrical main body 711 and suction port 333 thus returning the inner pressure of the container 2 to the normal atmospheric pressure. The normalized pressure in the container 2 will induce the instant impregnation of seasoning liquid into the seasoning material which is still in the state of deaeration. The container 2 is then removed from the base 11 by lifting the operating lever 9, and by rotating the main body casing 3 counterclockwise. The processed foodstuff may then be taken out onto whatever vessel desired.

Figure 10:
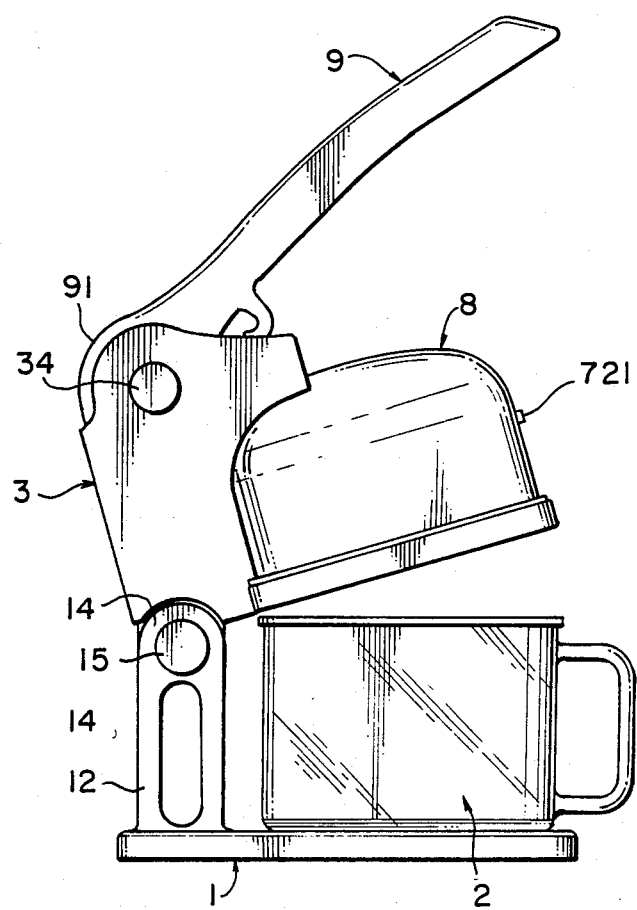
FIG. 10 is the front view of the seasoning device with its main body casing in rotating motion.
Figure 11:
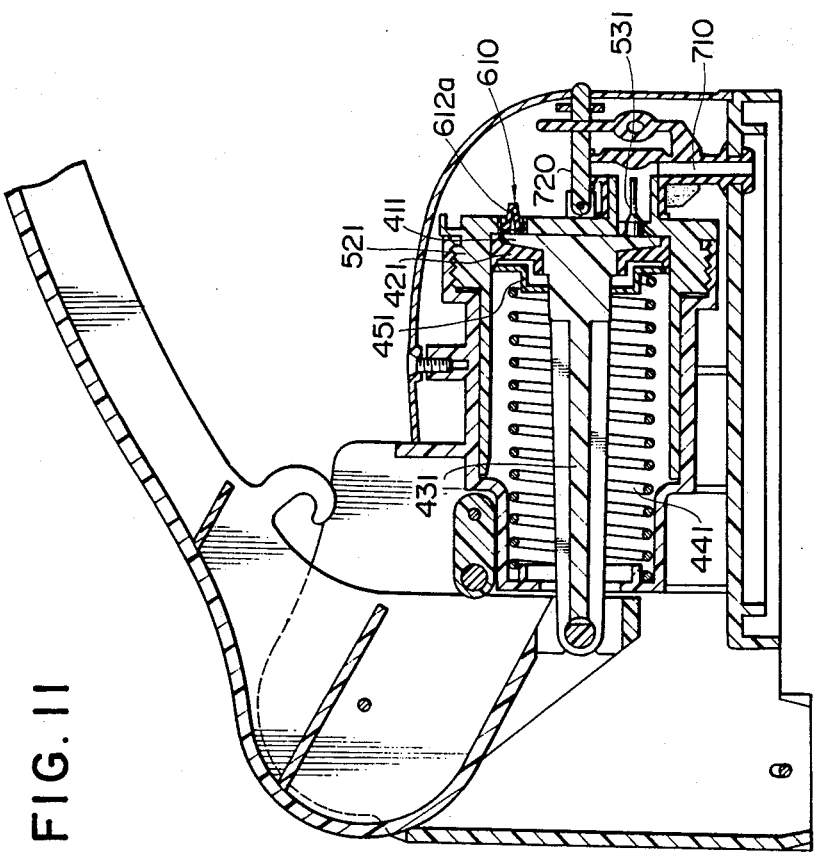
FIGS. 11 and 12 are a sectional view of the main part of another embodiment of the vacuum seasoning device of this invention and an oblique view of the disassembled vital part of its vacuum mechanism, in that order.
Figure 12:
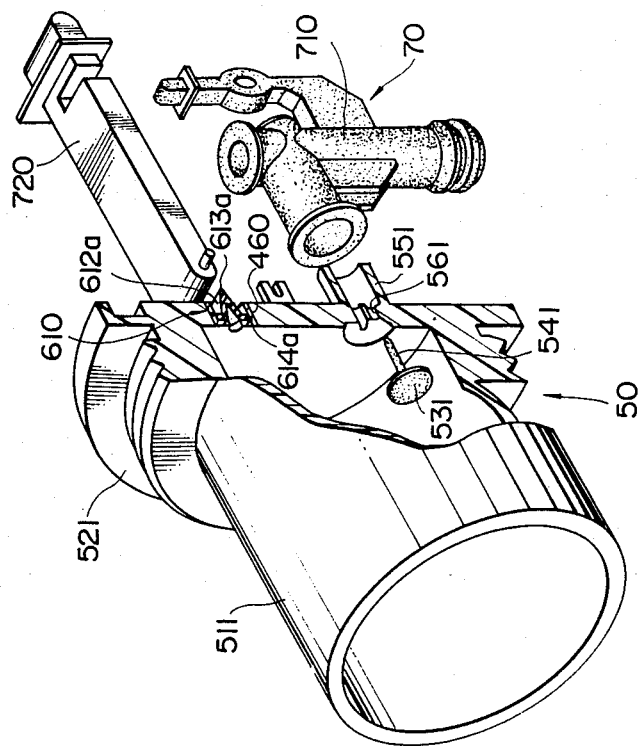
Figure 12:
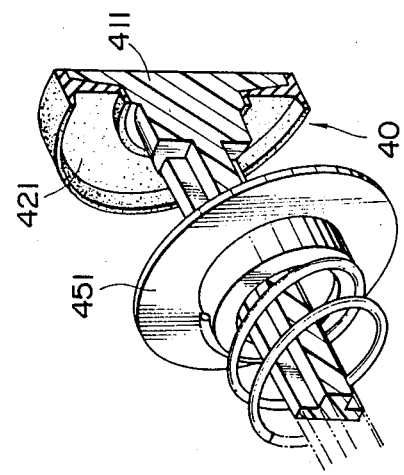

The FIGS. 11 and 12 illustrate another embodiment of vacuum seasoning device of this invention. With this device, the discharge channel 460 is formed on the bottom side of the cylinder 511 of the cylinder assembly 50, and said discharge channel 460 is so arranged that the discharge check valve 610 may be attached to it. While the discharge check valve 610 comprises, like the aforementioned embodiment, a flange 612a and cylindrical part, but said flange is installed not on the piston main body 411 but in the opposite direction, namely in such a way that the slit opening 613a is set in the opposite direction away from the cylinder. Both the flange part 612a of the discharge check valve 610 and the valve arrester 614a are installed in such a way that nothing will protrude from the bottom surface of the cylinder 511, while the discharge channel 460 is provided with an appropriate valve seat to that effect. The discharge check valve 610 functions identically as the previous embodiment in that the air within the cylinder will be discharged by the opening of the slit 613a when the piston assembly 40 moves toward the bottom of the cylinder. Also illustrated in the FIGS. 10 and 11 are the pushing disc 451, piston seal 421, suction valve 531, cylinder bottom flange 521, communicating assembly 70, release valve 720, and suction channel 551.

While the above mentioned embodiments indicate manual execution of the reciprocating movement of the piston by means of an operating lever, the prior art (not shown here) such as cam and reduction gear may be applied to drive the device electrically. The main body casing will still then house the piston, cylinder and the like arranged horizontally over the container in a similar manner as the above mentioned embodiments, and the main body casing will be rotatably supported through the pivots. The adoption of electrical driving mechanism may reduce the time required for the seasoning process, and at the same time makes it possible to reduce the dimensions of such device by removing the operating lever.

We claim:

1. A vacuum seasoning device which comprises a support stand (1) having a base (11), a container (2) located on said base, said support stand having a support column (12) on one side of said base, a main body casing (3) rotatably supported by said support column, said main body casing having side frame (31), a housing (32) projecting horizontally therefrom, and a base plate (33) projecting parallel thereto and below said housing (32), said side frame being pivotally supported at the lower edge thereof on said support column, whereby said body casing shifts its position between horizontal and a predetermined dihedral positive angle at its front end; said base plate, when positioned horizontally, serving as the lid to tightly contact the top opening edge of said container; a vacuum pump apparatus to decompress the interior of said container; which apparatus comprises a vacuum pump having a cylinder (5), a piston (4) located in said housing, piston rod (43), means of reciprocating said piston rod in said cylinder; a unidirectional suction valve (53) which sucks air into the cylinder and a unidirectional discharge check valve (61), said discharge check valve being located in said housing (32), said unidirectional suction valve (53) being located at the bottom of the cylinder whereby it does not interfere with the tight contact between the piston and the opposite surface at the bottom base of the cylinder at the time the piston moves forwardly, said unidirectional discharge valve communicating with the outside air; suction ports (33) bored through said base place (33), said suction ports having a suction channel (55); a release valve located on a part of said suction channel to release air from said container through said suction ports.

2. The device according to claim 1 wherein said means of reciprocating said piston rod comprises an operating lever (9) essentially in the shape of L, having one end pivotally supporting the rear end of the piston rod; a curved portion (91) pivotally supported at the upper end of said side frame (31), said lever forming a handle extending over said main body casing.

3. A vacuum seasoning device according to claim 1 wherein said means of reciprocating said piston rod comprises an electric motor and the driving mechanism which transmits the driving power to the rear end of the piston rod.

4. A vacuum seasoning device according to claim 1 wherein the pivot support of the said main body casing and support column comprise a vertically oblong hole and axis thereof which enable the main body casing to transpose its position vertically.

* * * * *